June 10, 1952    T. B. DILWORTH ET AL    2,599,699
FUEL SYSTEM FOR COMBUSTION APPARATUS
Filed May 13, 1947
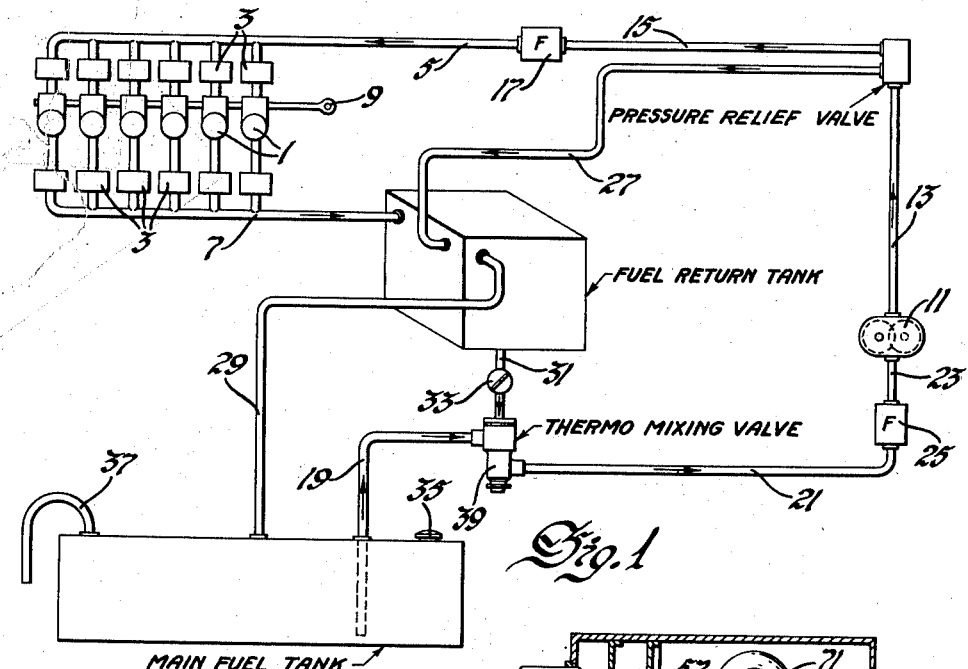
Inventors
Thomas B. Dilworth &
Milo M. Schalla
By Spencer, Willits, Helmig & Bailho
Attorneys Patented June 10, 1952

2,599,699

UNITED STATES PATENT OFFICE 2,599,699

FUEL SYSTEM FOR COMBUSTION APPARATUS

Thomas B. Dilworth, Clarendon Hills, and Milo M. Schalla, Oak Lawn, Ill., assignors to General Motors Corporation, Detroit, Mich., a corporation of Delaware Application May 13, 1947, Serial No. 747,758

10 Claims. (Cl. 158—36.3)

This invention relates to fuel systems for combustion apparatus.

The principal object of the invention is to provide fuel circulating means capable of supplying more fuel than the fuel injectors of the combustion apparatus can deliver and providing means for controlling the mixing of the cold fuel from a storage tank with the heated excess fuel returned from the injectors thereby preventing waxing and icing of the filters included in the fuel circulating system.

The combined means for accomplishing the above object will become apparent by reference to the following description and drawing illustrating these means included in a fuel system which is particularly adapted for supplying fuel to a diesel engine which is operated under wide and sudden changes in ambient temperature, humidity, barometric pressure, speed, load and output conditions such as encountered in diesel locomotive operation.

Figure 1 of the drawing is a diagrammatic view of the complete fuel system.

Figure 2 is an enlarged transverse sectional view of one of the control elements shown in Figure 1.

Figure 3 is a sectional view on line 3—3 of Figure 2.

Figure 4 is an enlarged vertical sectional view of another control element shown in Figure 1.

As shown schematically in Figure 1 a plurality of fuel injection pumps 1 are operated by a diesel engine, not shown. These pumps are provided with inlet and outlet filters 3 and are connected between a fuel pressure supply pipe 5 and a fuel return pipe 7. Each of the injection pumps 1 is associated with an engine cylinder and is provided with means, not shown, for spraying fuel at high pressure into the cylinder combustion space in conventional manner. A control rack 9 is shown interconnecting the injection pumps 1 for controlling the amount of fuel injected per stroke in a well known manner. The control rack may be operated manually or by means of an engine governor in conventional manner. Fuel is supplied to the fuel pressure supply pipe 5 by a suitable engine or motor driven fuel transfer pump 11 which is capable of supplying fuel in excess of the maximum amount of fuel discharged by the injection pumps. Fuel from the transfer pump 11 reaches the fuel pressure supply pipe 5 through pipe connections 13—15 which include a filter 17 and a conventional pressure relief valve for protecting the system from excessive pressure. The inlet side of the fuel transfer pump 11 is shown connected by means of pipes 21—23 and a filter 25 to a thermostatic mixing valve. A fuel inlet pipe 19 is connected between the mixing valve and a main fuel tank and extends substantially to the bottom thereof.

The fuel return pipe and a pressure relief pipe 27 from the pressure relief valve are shown connected to the upper portion of a fuel return tank. An overflow pipe 29 is also shown connected between the upper portions of the fuel return and main fuel tanks. A fuel return connection 31 including a shutoff valve 33 is shown connected between the bottom of the return tank and the thermostatic mixing valve. The main tank is shown provided with a filling opening closed with a removable cap 35 and an atmospheric vent 37.

As best illustrated in Figure 4 the thermostatic mixing valve comprises a hollow valve body 39 having a hollow seat element 41 secured in one end and extending through a larger internal diameter portion of the valve body to form an annular slot 42 therebetween. The valve body 39 is provided with a threaded inlet opening 43 to which the fuel return connection 31 from the fuel return tank is connected. The valve body 39 is also provided with a threaded inlet opening 45 to which the inlet pipe 19 from the main fuel tank is connected and a threaded outlet opening 47 to which the pipes 21—23 and filter 25 leading to the inlet side of the transfer pump 11 are connected. The threaded fuel return and inlet connections 43 and 45 in the valve body 39 are shown located on one side of the annular slot 42 between the hollow seat element 41 and valve body and the threaded outlet connection 47 in the body is shown located on the opposite side of the slot 42. A plug 49 is threaded in the other end of the valve body 39 and has a thermostatic element 51 secured to the inner face of the plug. A valve head 53 is secured to the inner face of the thermostatic element 51 and is movable thereby from the normal open position, shown, into seating contact with the inner end of the hollow seat element 41 upon expansion of the thermostatic element 51 when the temperature of the fuel in contact therewith reaches a temperature of 65° F. It will be evident that when the valve head 53 is seated on the valve seat 41, communication is cut off between the fuel return connection 31 of the return tank and the fuel inlet connections 19—21—23 and filter 25 to the inlet of the transfer pump 11, however the threaded fuel inlet and outlet connections 45 and 47 in the valve body being in communication through the annular slot 42 permit fuel flow between these connections and fuel inlet pipe connections 19—21—23 and filter 25 to the inlet of the fuel transfer pump 11.

As best illustrated in Figures 1, 2 and 3, the fuel return pipe 7, the pressure relief pipe 27 and the overflow pipe 29 are connected to the fuel return tank at substantially the same level and baffles 55—57 are secured in the return tank adjacent the open ends of these pipes to aid in separating the air and occluded vapor in the fuel entering the return fuel tank through the pipe 7 and to insure that the separated air, vapor and some excess fuel is diverted from the upper portion of the return tank through the overflow pipe 29 directly to the main fuel tank. As best illustrated in Figures 2 and 3 a balanced float control valve indicated generally at 59 is secured to the bottom of the return tank on the other side of the tank baffles 55—57. The valve 59 comprises a housing 60 having a central inlet cavity 61 opening into the interior of the return tank below the level of the baffle 57 and provided with vertically aligned valve seat openings 63—65 and an exterior outlet cavity 67 surrounding these seat openings and communicating with an opening 69 in the bottom of the return tank to which the fuel return pipe connection 31 is connected. A float 71 is secured on an arm 73 which is pivoted to the valve body at 75. A valve stem 77 is slidably mounted in an opening in the exterior outlet cavity 67 of the valve body 60 and is pivotally connected at 79 to the arm 73 for vertical movement by the float 71. The valve stem 77 is shown provided with two valve heads 81—83 which are seated on the valve seat openings 63—65 when there is minimum fuel in the return tank and the float 71 is accordingly at the lowest position in the return tank as shown in Figure 3. It will be evident that with the valve heads 81—83 seated, suction of the transfer pump 11 is applied to the upper face of the valve head 81 and to the lower face of the valve head 83 when the thermostatic mixing valve is open and the lower face of the valve head 81 and the upper face of the valve head 83 are subjected to the pressure head in the return tank to provide a substantially balanced pressure valve construction which is accordingly operable by slight movement of the float 71. It will likewise be evident that the higher the level of fuel in the return tank the farther the valve heads 81—83 will be moved off the seat openings 63—65 and the greater the amount of return fuel flow therethrough to the return connection leading to the thermostatic mixing valve.

With the injector control rack 9 in the starting position and the other control elements in the normal position as shown, as soon as the transfer pump 11 and engine are started, cold fuel at less than 65° F. will be supplied from the main fuel tank by the transfer pump 11 to the injection pumps 1 in an amount greater than the maximum amount delivered by these pumps through the pipe connections 19, 21, 23 including the thermostatic mixing valve 39 and filter 25 and pipe connections 13, 15, 5 including the pressure relief valve, filter 17 and injector inlet filters 3, the excess fuel flowing through the injectors will be heated and flow through the injector outlet filters 3 and fuel return pipe 7 to the fuel return tank. The pressure relief valve normally remains closed but opens upon excess pressure upon clogging of filters 17 and 3. Upon starting of the engine the fuel control rack is normally moved back to the idle fuel position to permit proper warm up of the engine at idle speed. At this speed the majority of fuel delivered to the injector pumps 1 passes through these pumps and is heated and returned through the injector outlet filters 3 and return pipe 7 to the return tank. Some of this heated fuel and the vapor therein is returned by the baffles in the return tank directly to the main fuel tank through the overflow pipe to heat the fuel therein. The remainder of this heated fuel flows over the baffle 57 in the fuel return tank causing the fuel level to increase therein and the float 71 of the valve 79 to rise and move the valve heads 81—83 away from their seat openings in proportion to the increase in fuel level in the return tank. The flow of heated fuel from the return tank through the return connection 31 to the then open thermostatic mixing valve is proportional to the level therein and hence more heated fuel will be drawn by the transfer pump 11 from the return connection 31 than from the inlet pipe 19 carrying cold fuel from the main tank. This greater amount of warm fuel and any water mixes with the smaller amount of cold fuel from the main tank in the space surrounding the thermostatic element 51 of the mixing valve and is circulated by the transfer pump 11 and thus prevents initial waxing and icing of the filter elements in the system in freezing weather thereby preventing restriction or cutoff of fuel flow. When the level of fuel in the return tank causes overflow of heated fuel through the overflow pipe 29 to the main tank, the float valve 59 is open to the maximum extent and the maximum amount of heated fuel is accordingly circulated by the transfer pump 11. When the injector fuel rack 9 is moved to cause more fuel to be discharged per stroke from the respective injection pumps and a corresponding increase in the engine speed, load and output there is less excess fuel returned to the return tank and this fuel is accordingly heated to a greater degree. This causes a decrease in the level of fuel in the return tank and the float 71 therein will fall and move the valve heads 81—83 toward the seat openings 63—65 and restrict the flow of this hotter return fuel to the mixing valve which causes more cold fuel from the main tank to mix therewith for circulation by the transfer pump 11. When the temperature of mixture of hot return fuel and cold fuel from the tank surrounding the thermostatic element 51 of the mixing valve reaches 65° F. the valve head 53 therein is seated. This condition occurs when the fuel in the main tank reaches 65° F., or above, and accordingly no return fuel from the return tank can enter the mixing valve, the return fuel from the injection pumps then passes from the return tank through the overflow pipe 29 directly to the main tank and fuel feed continues to the fuel injection pumps via the inlet pipes 19—21—23 and annular slot 42 in the mixing valve 39. For warm weather operation where the temperature of the fuel in the main tank is above 65° F. the shutoff valve 33 in the return connection from the return tank to the mixing valve may be shut off manually if desired.

With the above described fuel system it will be evident that in freezing weather the greater the amount of heated return fuel the less the cold fuel is mixed therewith for circulation in the system and conversely the lesser the amount of heated fuel returned the greater its temperature and the greater the amount of cold fuel is mixed therewith for circulation by the transfer pump 11 through the system.

This fuel system provides the means to prevent icing and waxing of the filters provided in fuel systems for combustion devices operated under extreme load and freezing atmospheric conditions.

We claim:

1. In a fuel system for combustion apparatus, fuel injection means adapted to be associated with and heated by the combustion apparatus and adapted to deliver variable quantities of fuel directly thereto, a main fuel tank, fuel supply connections including a mixing valve, filters and a transfer pump interconnecting said main tank and said injection means for supplying fuel thereto in excess of the maximum quantity delivered thereby to cause heating of the excess fuel in said fuel injection means, a fuel return tank for receiving the heated excess fuel from said injection means, said return tank having a fuel return connection with the fuel injection means, an overflow connection with said main fuel tank, a return fuel connection with said mixing valve, a float controlled valve in the return tank for controlling the flow of heated fuel in the return connection to said mixing valve in proportion to the level in said return tank for warming the fuel from said main tank in passing through said mixing valve to prevent icing and waxing of said filters, and temperature responsive means in said mixing valve for shutting off the flow of heated return fuel to said mixing valve when the temperature of the fuel mixture therein reaches a preselected value.

2. In a fuel system for combustion apparatus, a fuel injector adapted to be connected to and to receive heat from the combustion apparatus and adapted to deliver fuel thereto, a fuel tank, means including fuel supply connections including a pump and a filter and interconnecting said tank and said injector for supplying fuel from said tank to said injector in excess of the amount delivered thereby so that the excess fuel is heated in said injector, a fuel return connection interconnecting said injector and said tank and a second fuel return connection interconnecting said first fuel return connection and said fuel supply connections ahead of said filter, said second fuel return connection including temperature responsive control means for controlling the amount of excess heated fuel from said injector to said fuel supply connections ahead of said filter to warm the fuel supplied from said tank and prevent icing and waxing of said filter.

3. In a fuel system for combustion apparatus, fuel injection means adapted to be intimately associated with and heated by the combustion apparatus and adapted to deliver fuel directly to the combustion apparatus, a fuel tank, fuel supply connections including a filter and a pump interconnecting said tank and said fuel injection means for supplying fuel from said tank to said fuel injection means in excess of the amount delivered thereby so that the excess fuel is heated in said fuel injection means, a return fuel connection interconnecting said fuel injection means with said tank, a second fuel return connection interconnecting said fuel injection means with said supply connections ahead of said filter, said second fuel return connection including a valve controlling the return of some of the heated fuel from said injection means to said tank and some of the heated fuel, in proportion to the excess supplied thereto, directly to said fuel supply connections ahead of said filter to warm the cold fuel in the supply connections from said tank and prevent icing and waxing of said filter, and a second valve means responsive to a predetermined temperature of the mixture of fuel ahead of said filter in the supply connections to stop the flow of heated return fuel to the fuel supply connections.

4. In a fuel system for combustion apparatus, a plurality of fuel injectors adapted to be mounted on and be heated by said apparatus and adapted to inject fuel into said apparatus, means for controlling the amount of fuel delivered by said injectors, said injectors having fuel inlet and outlet filters, a main fuel tank, a fuel transfer pump having a fuel inlet pipe connected to said main tank and including a mixing valve and a fuel pressure supply pipe connected to said injectors and including a fuel filter and a pressure relief valve, said transfer pump being capable of supplying fuel in excess of the maximum amount delivered by said injection pumps, the excess fuel being heated in said injection pumps, a fuel return tank for receiving the heated excess fuel from said injectors, an excess return fuel connection interconnecting the upper portion of said return tank and the outlet filters of said injectors, an overflow connection interconnecting the upper portion of said return tank to said main fuel tank to convey heated fuel and vapor thereto, a return fuel connection from the lower portion of said return tank to said mixing valve, a float controlled valve in said return tank and connected to the return connection for controlling the flow of heated fuel to said mixing valve in proportion to the fuel level in said return tank, the heated fuel in said mixing valve mixing with the cold fuel from the main tank preventing icing and waxing of said filters, and means responsive to a preselected temperature of the fuel mixture in said mixing valve for shutting off the flow of heated fuel thereto.

5. In a fuel system for combustion apparatus, variable delivery fuel injection pumps adapted to be associated with and heated by the combustion apparatus and adapted to inject fuel therein, said injection pumps having fuel inlet and return filters, a main fuel tank, a return fuel tank, a fuel transfer pump having a fuel inlet connection to the main tank, said connection including a mixing valve and a filter and an outlet connection including a filter and an excess pressure relief valve and connected to the inlet filters of the injection pumps, said transfer pump delivering fuel in excess to that delivered by the injection pumps, said fuel return tank including baffles, an excess fuel return connection, a pressure relief connection and an overflow connection connected to the upper portion of the return tank on one side of the baffles therein, said excess fuel return connection being connected to the outlet filters of the injection pumps for conveying the excess fuel heated therein to the return tank, said overflow connection being connected to the main tank to convey heated fuel and vapor thereto, said pressure relief connection being connected to the excess pressure relief valve, and a fuel connection from the lower portion of the tank on the other side of the baffles therein connected to the mixing valve, a float controlled valve in the return tank at the entrance of the fuel connection to the mixing valve operable to vary the flow of heated return fuel from the return tank to the mixing valve in proportion to the level of the fuel in the return tank to warm the fuel in the inlet connection to the transfer pump ahead of the filters to prevent icing and waxing of the filters, said mixing valve having a temperature responsive element for cutting off the flow of heated fuel from the return tank when the temperature of the fuel mixture in the mixing valve rises to a preselected value so that fuel from the main tank is then supplied to the injection pumps.

6. In a fuel system for combustion apparatus, a variable delivery fuel injection pump adapted to be associated with and heated by the combustion apparatus, a main fuel tank, fuel supply connections including a mixing valve, a filter and a fuel transfer pump interconnecting said main fuel tank and said injection pump for supplying fuel in excess of the maximum amount delivered by said injection pump to cause heating of the excess fuel in said injection pump, a fuel return connection extending from said fuel injection pump to said mixing valve, said fuel return connection including control valve means operable in response to the amount of heated excess fuel returned from said fuel injecting pump to cause a proportional amount of heated fuel to enter said mixing valve to mix with and warm the cold fuel supplied from said main tank to prevent icing and waxing of said filter, and a branch fuel return connection extending from said fuel return connection ahead of said control valve means to the main tank for the return of the remainder of the heated excess fuel to said main tank.

7. In a fuel system for combustion apparatus, variable delivery fuel injection pumps adapted to be associated with and heated by the combustion apparatus and adapted to inject fuel therein, a main fuel tank, fuel supply connections including a mixing valve means, fuel filter means and a transfer pump interconnecting said main tank and fuel injection pumps for supplying fuel thereto in excess of the maximum amount injected into the combustion apparatus in order to heat the excess fuel therein, a fuel return connection for the heated excess fuel extending from said fuel injection pumps to said mixing valve, temperature responsive means in said mixing valve to cut off entry of heated return fuel to said mixing valve upon a rise in temperature therein above that necessary to prevent icing and waxing of said filters, and a branch fuel return connection extending from said return fuel connection ahead of said mixing valve to said main fuel tank.

8. In a fuel system for combustion apparatus, the combination of variable delivery fuel injection means adapted for injecting fuel in and adapted to be heated by the combustion apparatus, a fuel supply tank, fuel supply connections extending from said tank to said fuel injecting means and including fuel filters, a mixing valve and a fuel supply pump for delivering fuel to said fuel injection means in excess of the maximum amount injected thereby into the combustion apparatus and a fuel return connection leading from said fuel injection means to said mixing valve, said fuel return connection including valve means acting in response to the amount of heated excess fuel entering said fuel return connection to cause a proportional amount of heated fuel to enter said mixing valve to mix with and warm the fuel entering said mixing valve from said tank to prevent icing and waxing of said filters in said fuel supply connections, temperature responsive means in said mixing valve to cut off entry of heated excess return fuel upon a preselected rise in temperature of the fuel mixture therein and a branch fuel return connection extending from said fuel return connection upstream from said valve means therein to said fuel supply tank.

9. In a fuel system for combustion apparatus, fuel injection means adapted to inject fuel into and adapted to be heated by the combustion apparatus, a fuel supply tank, fuel delivery means for delivering fuel from the tank to the injection means at a rate normally in excess of that at which the fuel is injected by the injection means, fuel return means for returning the heated excess fuel from the injection means to both the tank and said delivery means, and temperature responsive means responsive to the fuel temperature in said delivery means for controlling the return of said excess fuel to said delivery means.

10. In a fuel system for combustion apparatus, a fuel charge-forming device adapted to heat fuel delivered thereto and to subject a portion of said heated fuel to combustion, a fuel tank, fuel delivery means delivering fuel from the tank to said device at a rate exceeding the rate fuel is subjected thereby to combustion, fuel return means returning the heated excess fuel from said device to the tank, said return means having branch means by-passing the tank and connected with said delivery means, valve means in said branch means operable in response to fuel temperature in said delivery means for cutting off fuel flow through said branch means.

THOMAS B. DILWORTH.
MILO M. SCHALLA.

REFERENCES CITED

The following references are of record in the file of this patent:

UNITED STATES PATENTS

| Number | Name | Date |
| --- | --- | --- |
| 1,348,406 | Green | Aug. 3, 1920 |
| 1,854,603 | Robinson | Apr. 19, 1932 |
| 1,867,491 | Braren | July 12, 1932 |
| 1,962,448 | Kreuzer | June 12, 1934 |
| 2,062,644 | Ensign | Dec. 1, 1936 |
| 2,133,394 | Mortier | Oct. 18, 1938 |
| 2,157,737 | Janssen | May 9, 1939 |
| 2,199,454 | Andler et al. | May 7, 1940 |
| 2,262,617 | L'Orange | Nov. 11, 1941 |

FOREIGN PATENTS

| Number | Country | Date |
| --- | --- | --- |
| 438,854 | Germany | Dec. 28, 1926 |